(12) United States Patent
Bowman (10) Patent No.: US 12,129,941 B2
(45) Date of Patent: *Oct. 29, 2024

(54) COUPLING HAVING ARCUATE STIFFNESS RIBS (71) Applicant: Victaulic Company, Easton, PA (US)

(72) Inventor: Matthew A. Bowman, Palmer, PA (US)

(73) Assignee: VICTAULIC COMPANY, Easton, PA (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/782,192

(22) Filed: Feb. 5, 2020

(65) Prior Publication Data
US 2020/0173585 A1 Jun. 4, 2020

Related U.S. Application Data (62) Division of application No. 14/263,350, filed on Apr. 28, 2014, now Pat. No. 10,578,234.

(60) Provisional application No. 61/818,686, filed on May 2, 2013.

(51) Int. Cl.
*F16L 17/04* (2006.01)
*F16L 21/08* (2006.01)

(52) U.S. Cl.
CPC ............. *F16L 17/04* (2013.01); *F16L 21/08* (2013.01); *F16L 2201/10* (2013.01)

(58) Field of Classification Search
CPC ............ F16L 17/04; F16L 21/08; F16L 21/06
USPC .......................................................... 285/420
See application file for complete search history.

(56) References Cited

U.S. PATENT DOCUMENTS

| 1,020,123 | A | 3/1912 | Brampton et al. |
| 1,074,395 | A | 9/1913 | Welch |
| 1,203,989 | A | 11/1916 | Dehn |
| 1,287,108 | A | 12/1918 | Robinson et al. |
| 1,379,811 | A | 5/1921 | Fyffe |
| 1,497,549 | A | 6/1924 | Conradi |
| 1,831,641 | A | 7/1927 | Skinner |
| 1,649,594 | A | 11/1927 | Johnson |
| 1,770,271 | A | 7/1930 | Hoppes |
| 1,969,043 | A | 8/1934 | Sham |

(Continued)

FOREIGN PATENT DOCUMENTS

| CN | 102345774 | 2/2012 |
| CN | 102933886 | 2/2013 |

(Continued)

*Primary Examiner* — Amber R Anderson
*Assistant Examiner* — Fannie Kee
(74) *Attorney, Agent, or Firm* — Ballard Spahr LLP (57) ABSTRACT A coupling for joining pipe elements end to end has a unitary band surrounding a central space for receiving the pipe elements. Ends of the band are in facing relation. Adjustable connection members are positioned at each end of the band for drawing the ends toward each other and deforming the band. Arcuate ribs are positioned lengthwise along opposite sides of the band. The ribs are separated from one another by gaps between the ribs. In their undeformed state, each rib has an arcuate surface with a radius of curvature equal to the radius of curvature of the outer surface of the pipe elements which they engage. When the band is deformed the ribs clamp against the outer surface of the pipe elements to effect the joint.

12 Claims, 10 Drawing Sheets

(56) References Cited

U.S. PATENT DOCUMENTS

| | | |
|---|---|---|
| 1,999,045 A | 4/1935 | Goetz |
| 2,021,081 A | 11/1935 | Nagao |
| 2,021,082 A | 11/1935 | North |
| 2,094,258 A | 9/1937 | Thompson |
| 2,128,720 A | 8/1938 | Tweedale |
| 2,225,208 A | 12/1940 | Crickmer |
| 2,412,394 A | 12/1946 | Giles |
| 2,426,423 A | 8/1947 | Woolsey |
| 2,459,251 A | 1/1949 | Stillwagon |
| 2,463,235 A | 3/1949 | Andrews |
| 2,490,640 A * | 12/1949 | Lefevre-Selmer ...... F16L 21/06 285/410 |
| 2,491,004 A | 12/1949 | Graham |
| 2,635,901 A | 4/1953 | Osborn |
| 2,775,806 A | 1/1957 | Love |
| 2,926,028 A | 2/1960 | Hookings et al. |
| 2,958,546 A | 11/1960 | Lee |
| 3,014,259 A | 12/1961 | Louis |
| 3,116,078 A | 12/1963 | Scherer |
| 3,148,896 A | 9/1964 | Chu |
| 3,153,550 A | 10/1964 | Hollett |
| 3,235,293 A | 2/1966 | Condon |
| 3,362,730 A | 1/1968 | Clair et al. |
| 3,466,069 A | 9/1969 | Hoke et al. |
| 3,517,701 A | 6/1970 | Smith |
| 3,596,935 A | 8/1971 | McGeoch |
| 3,633,943 A | 1/1972 | Ramm et al. |
| 3,680,894 A | 8/1972 | Young |
| 3,788,677 A | 1/1974 | Stade et al. |
| 3,794,360 A | 2/1974 | Bachle et al. |
| 3,825,286 A | 7/1974 | Henry, III |
| 3,861,723 A | 1/1975 | Kunz et al. |
| 3,920,270 A | 11/1975 | Babb, Jr. |
| 3,944,260 A | 3/1976 | Petroczky |
| 4,018,979 A | 4/1977 | Young |
| 4,073,514 A | 2/1978 | Pate |
| 4,119,333 A | 10/1978 | Straub |
| 4,123,090 A | 10/1978 | Kotsakis et al. |
| 4,225,160 A | 9/1980 | Ortloff |
| 4,273,367 A | 6/1981 | Keeney et al. |
| 4,284,298 A | 8/1981 | Kaufmann, Jr. |
| 4,443,029 A | 4/1984 | Laxo |
| 4,461,498 A | 7/1984 | Kunsman |
| 4,471,979 A | 9/1984 | Gibb et al. |
| 4,611,839 A | 9/1986 | Rung et al. |
| 4,629,217 A | 12/1986 | Straub |
| 4,633,913 A | 1/1987 | Carty et al. |
| 4,639,020 A | 1/1987 | Rung et al. |
| 4,652,023 A | 3/1987 | Timmons |
| 4,664,422 A | 5/1987 | Straub |
| 4,678,208 A | 7/1987 | DeRaymond |
| 4,792,160 A | 12/1988 | Hwang |
| 4,838,584 A | 6/1989 | Dierksmeier |
| 4,861,075 A | 8/1989 | Pepi et al. |
| 4,893,843 A | 1/1990 | DeRaymond |
| 4,896,902 A | 1/1990 | Weston |
| 4,898,407 A | 2/1990 | Zeidler |
| 5,018,768 A | 5/1991 | Palatchy |
| 5,022,685 A | 6/1991 | Stiskin et al. |
| 5,121,946 A | 6/1992 | Jardine |
| 5,137,305 A | 8/1992 | Straub |
| 5,161,836 A | 11/1992 | McKinnon |
| 5,203,594 A | 4/1993 | Straub |
| 5,230,537 A | 7/1993 | Newman |
| 5,273,322 A | 12/1993 | Straub |
| 5,280,970 A | 1/1994 | Straub |
| 5,452,922 A | 9/1995 | Ziu |
| 5,603,350 A | 2/1997 | Stoll et al. |
| 5,605,865 A | 2/1997 | Maniar et al. |
| 5,658,021 A * | 8/1997 | Matsumoto ............. F16L 21/06 285/112 |
| 5,675,873 A | 10/1997 | Groess |
| 5,681,062 A | 10/1997 | Fukao et al. |
| 5,722,702 A | 3/1998 | Washburn |
| 5,758,907 A | 6/1998 | Dole et al. |
| 5,769,467 A | 6/1998 | Bridges |
| 5,782,499 A | 7/1998 | Gfrer et al. |
| 5,786,054 A | 7/1998 | Platusich et al. |
| 5,813,437 A | 9/1998 | Esser |
| 5,911,446 A | 6/1999 | McLennan et al. |
| 5,961,154 A | 10/1999 | Williams et al. |
| 6,030,006 A | 2/2000 | Lin |
| 6,056,332 A | 5/2000 | Foster |
| 6,276,726 B1 | 8/2001 | Daspit |
| 6,276,729 B1 | 8/2001 | Sanwald et al. |
| 6,305,719 B1 | 10/2001 | Smith, Jr. et al. |
| 6,328,352 B1 | 12/2001 | Geppert et al. |
| 6,367,849 B1 | 4/2002 | Tatsuta et al. |
| 6,450,551 B1 | 9/2002 | Lee |
| 6,499,771 B1 | 12/2002 | Snyder, Sr. et al. |
| 6,502,865 B1 | 1/2003 | Steele |
| 6,505,865 B2 | 1/2003 | Minemyer |
| 6,626,456 B2 | 9/2003 | Terbu et al. |
| 6,672,631 B1 | 1/2004 | Weinhold |
| 6,749,232 B2 | 6/2004 | Wachter |
| 7,070,209 B2 | 7/2006 | Collins |
| 7,086,131 B2 | 8/2006 | Gibb et al. |
| 7,341,287 B2 | 3/2008 | Gibb et al. |
| 7,434,846 B2 | 10/2008 | Baumgartner |
| 7,490,866 B2 | 2/2009 | Webb et al. |
| 7,500,699 B2 | 3/2009 | Snyder, Sr. et al. |
| 7,523,963 B2 | 4/2009 | Draper |
| 7,644,960 B2 | 1/2010 | Casey, Sr. et al. |
| 7,654,587 B2 | 2/2010 | Gibb et al. |
| 7,712,796 B2 | 5/2010 | Gibb et al. |
| 7,726,703 B2 | 6/2010 | Porter et al. |
| 7,789,434 B2 | 9/2010 | Nagle et al. |
| 7,798,535 B2 | 9/2010 | Calhoun |
| 7,841,630 B1 | 11/2010 | Auray et al. |
| 7,861,982 B1 | 1/2011 | McClure |
| 8,424,179 B2 | 4/2013 | Webb et al. |
| 8,820,795 B2 | 9/2014 | Dole |
| 8,827,214 B2 | 9/2014 | Ogawa |
| 9,791,083 B2 | 10/2017 | Gibb |
| 9,890,884 B1 | 2/2018 | Chiproot |
| 9,976,677 B2 | 5/2018 | Lurk |
| 2002/0135184 A1 | 9/2002 | Snyder, Sr. et al. |
| 2002/0185868 A1 | 12/2002 | Snyder, Sr. et al. |
| 2003/0020276 A1 | 1/2003 | Steele |
| 2004/0237632 A1 | 12/2004 | Van Keeken |
| 2005/0001428 A1 | 1/2005 | Scherrer |
| 2005/0028366 A1 | 2/2005 | Bien et al. |
| 2005/0067538 A1 | 3/2005 | Stigler |
| 2005/0082831 A1 | 4/2005 | Borland |
| 2005/0253380 A1 | 11/2005 | Gibb et al. |
| 2006/0138776 A1 | 6/2006 | Amedure et al. |
| 2007/0024056 A1 | 2/2007 | Borland |
| 2008/0265568 A1 | 10/2008 | Bekkevold |
| 2008/0272595 A1 | 11/2008 | Gibb et al. |
| 2009/0127846 A1 | 5/2009 | Dole et al. |
| 2009/0160183 A1 | 6/2009 | Felber |
| 2009/0172939 A1 | 7/2009 | Dole |
| 2009/0206598 A1 | 8/2009 | Gibb et al. |
| 2010/0115733 A1 | 5/2010 | Bouchiat |
| 2010/0320756 A1 | 12/2010 | Gibb et al. |
| 2010/0320758 A1 | 12/2010 | Sisk |
| 2010/0327576 A1 | 12/2010 | Linhorst et al. |
| 2011/0062706 A1 | 3/2011 | Henry |
| 2011/0154646 A1 | 6/2011 | Hagiya |
| 2011/0254268 A1 | 10/2011 | Johnson et al. |
| 2012/0074689 A1 | 3/2012 | Petersen et al. |
| 2012/0098259 A1 | 4/2012 | Sarkisian et al. |
| 2012/0205909 A1 | 8/2012 | Bird |
| 2012/0235405 A1 | 9/2012 | Dole et al. |
| 2012/0256415 A1 | 10/2012 | Dole |
| 2012/0306118 A1 | 12/2012 | Hayashyi et al. |
| 2013/0181446 A1 | 7/2013 | Le Clinche |
| 2013/0327415 A1 | 12/2013 | Camp, Jr. et al. |
| 2014/0327238 A1 | 11/2014 | Bowman |
| 2015/0021911 A1 | 1/2015 | Bowman et al. |
| 2015/0074952 A1* | 3/2015 | Rigollet ................. F16L 21/06 24/19 |
| 2015/0176728 A1 | 6/2015 | Bowman |
| 2015/0204471 A1 | 7/2015 | Sato |

(56) References Cited

U.S. PATENT DOCUMENTS

| | | |
|---|---|---|
| 2016/0084420 A1 | 3/2016 | Barrientos |
| 2017/0184226 A1 | 6/2017 | Cuvo et al. |
| 2017/0328500 A1 | 11/2017 | Bowman et al. |
| 2017/0328507 A1 | 11/2017 | Sith et al. |
| 2018/0163905 A1 | 6/2018 | Ohnemus et al. |
| 2018/0163906 A1 | 6/2018 | Ohnemus et al. |
| 2019/0032824 A1 | 1/2019 | McNamara et al. |
| 2019/0032825 A1 | 1/2019 | McNamara et al. |

FOREIGN PATENT DOCUMENTS

| | | | | |
|---|---|---|---|---|
| CN | 105423015 | | 3/2016 | |
| CN | 105473923 | | 4/2016 | |
| DE | 1191181 B | * | 4/1965 | ............. F16L 21/06 |
| DE | 1750138 A1 | * | 1/1970 | ............. F16L 21/06 |
| DE | 3111997 | | 10/1982 | |
| DE | 3443942 | | 6/1985 | |
| DE | 3443943 | | 6/1985 | |
| DE | 3931275 A1 | * | 3/1991 | ............. F16L 21/06 |
| DE | 19532356 | | 4/1996 | |
| DE | 19514940 C1 | * | 10/1996 | ............. F16L 21/06 |
| DE | 19810206 C1 | * | 5/1999 | ............. F16L 21/06 |
| DE | 10006029 | | 8/2001 | |
| EP | 0462454 | | 12/1991 | |
| EP | 0675311 A1 | * | 10/1995 | ............. F16L 21/06 |
| EP | 2113701 | | 11/2009 | |
| EP | 1840439 | | 6/2010 | |
| EP | 2487397 | | 8/2012 | |
| FR | 2747453 | | 4/1997 | |
| FR | 2921985 | | 3/2013 | |
| GB | 2016627 A | * | 9/1979 | ............. F16L 21/06 |
| GB | 2098297 | | 11/1982 | |
| JP | 52126317 | | 3/1951 | |
| JP | S524772 | | 2/1993 | |
| JP | 07269764 | | 10/1995 | |
| JP | 2001304468 | | 10/2001 | |
| JP | 2002147664 | | 5/2002 | |
| JP | 2006250247 | | 9/2006 | |
| JP | 2007537414 | | 12/2007 | |
| JP | 201163474 | | 8/2011 | |
| JP | 2012189147 | | 10/2012 | |
| KR | 100315861 | | 11/2001 | |
| KR | 20030067643 A | * | 8/2003 | ............. F16L 21/06 |
| KR | 1020090007813 | | 1/2009 | |
| KR | 100904419 | | 6/2009 | |
| KR | 1020090066767 | | 6/2009 | |
| KR | 100922595 B1 | * | 10/2009 | ............. F16L 21/06 |
| WO | 199703811 | | 2/1997 | |
| WO | WO-0159350 A1 | * | 8/2001 | ............. F16L 21/06 |
| WO | 2005114023 | | 12/2005 | |
| WO | 2013115963 | | 8/2013 | |

\* cited by examiner

COUPLING HAVING ARCUATE STIFFNESS RIBS

CROSS REFERENCE TO RELATED APPLICATIONS

This application is a divisional of and claims priority to U.S. application Ser. No. 14/263,350, filed Apr. 28, 2014, which application is based upon and claims priority to U.S. Provisional Application No. 61/818,686, filed May 2, 2013, all applications being hereby incorporated by reference herein.

FIELD OF THE INVENTION

This invention relates to couplings for joining pipe elements in end to end relation.

BACKGROUND

"Straub" type couplings are formed of a unitary band having free ends which are subjected to tangential tension force to clamp the band around pipe elements to be joined end to end. Under the tension force, the band deforms radially inwardly to encompass a smaller diameter and forces toothed retainer rings captured between the band and the pipe elements into engagement with the pipe elements. Deformation of the band also compresses a seal against the pipe elements to ensure a fluid-tight joint. Examples of Straub type couplings are disclosed in U.S. Pat. Nos. 4,629,217, 4,664,422, 5,137,305 and 5,280,970.

Joints formed by Straub type couplings are often flexible in bending. While bending flexibility is sometimes desired in piping networks, for those situations when more rigidity in bending is needed, Straub type couplings are inappropriate. There is clearly a need for a coupling which combines the advantages of the Straub type coupling with the increased bending stiffness normally associated with other types of mechanical couplings.

SUMMARY

The invention concerns a coupling for joining pipe elements in end to end relation. In one example embodiment, the coupling comprises a unitary band surrounding a central space for receiving the pipe elements. The band has first and second ends positioned in facing relation. A plurality of arcuate ribs are positioned end to end along opposite sides of the band. Each of the ribs projects toward an axis coaxial with the central space. Each of the ribs has a surface facing the axis. The surface on each of the ribs has a radius of curvature equal to a radius of curvature of an outer surface of the pipe elements when the ribs are in an undeformed state. Connection members are positioned on the first and second ends of the band. The connection members are adjustably tightenable for drawing the first and second ends toward one another. The band is deformable between each of the ribs. This allows the first and second ends to move toward one another upon adjustable tightening of the connection members. The surfaces on each of the ribs are thereby being brought into engagement with the outer surfaces of the pipe elements.

In a particular example embodiment, the coupling also comprises a seal positioned within the central space between the arcuate ribs. The seal surrounds the axis and is engageable with the band and the pipe elements for sealingly joining the pipe elements end-to-end.

By way of example, the connection members may comprise a pair of projections. One projection is positioned on each of the first and second ends of the band. The projections extend outwardly and are adapted to receive a fastener. The fastener is adjustably tightenable for drawing the first and second ends toward one another. In a specific example embodiment, the projections comprise lugs. Each lug has an aperture therethrough sized to receive the fastener.

In another example embodiment, the coupling further comprises a first split ring positioned within the central space. The first split ring is positioned adjacent to the arcuate ribs along a first one of the sides of the band. The first split ring has a plurality of teeth projecting toward the axis. The teeth engage the outer surface of the pipe element. In another example embodiment, the coupling may further comprise a second split ring positioned within the central space adjacent to the arcuate ribs. The second split ring is positioned along a second one of the sides of the band. The second split ring has a plurality of teeth projecting toward the axis. The teeth of the second split ring engage the outer surface of the pipe element.

In another example embodiment, the coupling comprises a first plurality of grooves. Each groove extends lengthwise along a respective one of the ribs positioned along a first side of the band. Each of the grooves faces the axis. A first split ring is positioned within the first plurality of grooves. The first split ring has a plurality of teeth projecting toward the axis. The teeth engage the outer surface of the pipe element. The example embodiment may further comprise a second plurality of grooves. Each groove of the second plurality extends lengthwise along a respective one of the ribs positioned along a second side of the band. Each groove of the second plurality faces the axis. A second split ring is positioned within the second plurality of grooves. The second split ring has a plurality of teeth projecting toward the axis. The teeth of the second split ring engage the outer surface of the pipe element.

Example embodiments of couplings according to the invention may be adapted to join pipe elements including plain end pipe elements, circumferentially grooved pipe elements, and shoulder end pipe elements.

In a particular embodiment of a coupling according to the invention, the surfaces on the ribs engage the outer surfaces of said pipe elements when the connection members contact one another. In a further example, the ribs are separated from one another by gaps positioned between each of the ribs.

The invention also encompasses the combination of a pair of pipe elements and a coupling for joining the pipe elements in end to end relation. In an example embodiment, each of the pipe elements comprises an outer surface having a radius of curvature. By way of example the coupling comprises a unitary band surrounding a central space for receiving the pipe elements. The band has first and second ends positioned in facing relation. A plurality of arcuate ribs are positioned end to end along opposite sides of the band. Each of the ribs projects toward an axis coaxial with the central space. Each of the ribs has a surface facing the axis. The surface on each of the ribs has a radius of curvature equal to the radius of curvature of the outer surface of the pipe elements when the ribs are in an undeformed state.

The example further includes connection members positioned on the first and second ends of the band. The connection members are adjustably tightenable for drawing the first and second ends toward one another. The band is deformable between each of the ribs which allows the first and second ends to move toward one another upon adjustable tightening of the connection members. The surfaces on each of the ribs is thereby brought into engagement with the outer surfaces of the pipe elements.

In an example combination, the pipe elements may be selected from the group consisting of plain end pipe elements, circumferentially grooved pipe elements, and shoulder end pipe elements.

In a particular embodiment, the ribs are separated from one another by gaps positioned between each of the ribs.

The invention also contemplates a method of joining pipe elements in end to end relation. In one example embodiment, the method comprises:

inserting the pipe elements into a central space defined by an undeformed unitary band having first and second ends in facing relation and a plurality of arcuate ribs positioned end to end along opposite sides of the band, each of the ribs having a surface with a radius of curvature equal to a radius of curvature of an outer surface of the pipe elements;

drawing the first and second ends toward one another thereby deforming the band at a plurality of points between the plurality of ribs so as to engage the surfaces of the ribs with the outer surfaces of the pipe elements.

The example method may further comprise compressing a split ring positioned within the central space and adjacent to the ribs along one of the sides of the band, the split ring having a plurality of teeth, the teeth being forced into engagement with one of the pipe elements.

DETAILED DESCRIPTION

Figure 1:
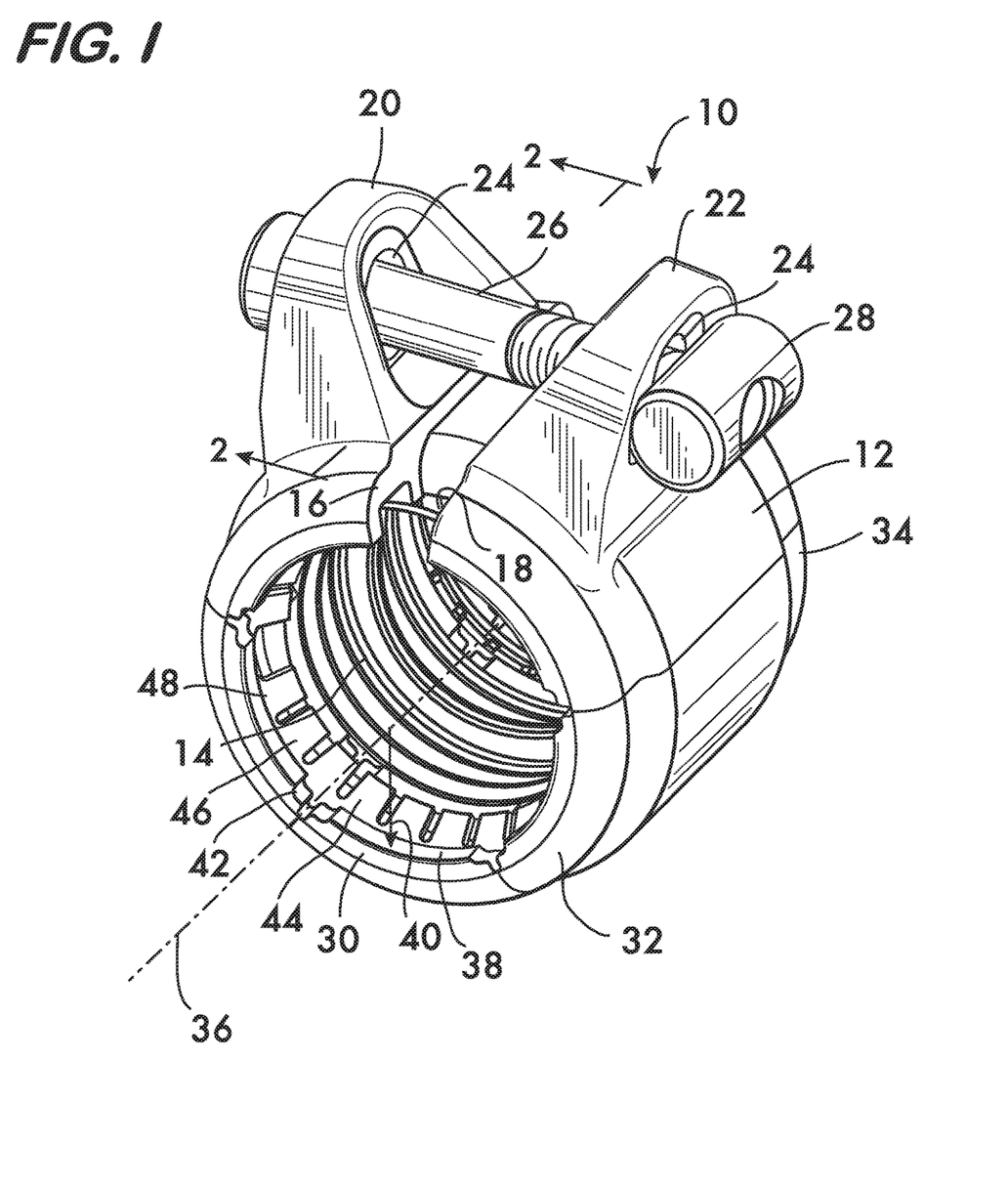
FIG. 1 is an isometric view of an example embodiment of a coupling according to the invention.

FIG. 1 shows an example coupling 10 according to the invention. Coupling 10 comprises a unitary band 12 which extends circumferentially to surround and define a central space 14. Band 12 is sized so that central space 14 may receive axially inserted pipe elements (see FIGS. 3-5) to be joined end to end. The pipe elements are inserted axially into the central space 14 from opposite sides of the coupling 10. Band 12 has first and second opposite ends 16 and 18 which are positioned in facing relation. Connection members, in this example, outwardly projecting lugs 20 and 22, are positioned respectively on the first and second ends 16 and 18 of the band 12. Each lug 20, 22 has an aperture 24 adapted to receive an adjustably tightenable fastener, in this example bolt 26 and barrel nut 28. Tightening of the bolt and barrel nut draws the first and second ends 16 and 18 toward one another to clamp the coupling 10 to the pipes being joined as described in detail below. Note that the cylindrical surface of the barrel nut 28 facilitates relative rotation of the lug 22, thereby lowering the torque required to draw the ends 16 and 18 together.

A plurality of arcuate ribs 30 are positioned end to end along opposite sides 32 and 34 of the band 12. Each rib 30 projects toward an axis 36 arranged coaxially with the central space 14. Each rib 30 has a surface 38 facing the axis 36. In the example embodiment disclosed herein, surfaces 38 are shown as flat surfaces, however, it is understood that the term "surface" as used with reference to ribs 30 encompasses other shapes such as concave, convex as well as knife-edged shapes. When each rib is in an undeformed state, each surface 38 has a radius of curvature 40 equal to the radius of curvature of the outer surface of the pipe element which it engages when forming the joint. Couplings 10, having surfaces 38 with a radius of curvature 40 equal to the pipe element outer surface when ribs 30 are in an undeformed state, are unlike prior art Straub type couplings, wherein the inwardly facing surfaces, in their undeformed state, have a greater radius of curvature than the pipe elements to permit axial insertion of the pipe elements into the coupling. In the coupling 10, the ribs 30 do not deform significantly. Deformation in coupling 10 is substantially confined to regions of the band 12 between the ribs 30 through the presence of gaps 42 positioned between each rib 30. Gaps 42 isolate the ribs from one another, thereby allowing the ribs 30 to act independently of one another and the band when the band deforms radially upon tightening of the bolt 26.

When used to join plain end pipe elements the coupling 10 includes retainers 44. The retainers are positioned on opposite sides 32 and 34 of the band 12 within the central space 14 and adjacent to the ribs 30. Retainers 44 comprise a split ring 46 having a plurality of teeth 48 that project toward the axis 36. Retainers 44 are advantageously formed of spring steel. In a particular example embodiment, the teeth may be sized to grip and hold the pipe elements upon insertion into the central space. The gripping and holding action of the retainers 44 greatly facilitates assembly of the joint, as it is not necessary to independently hold either the pipe element or the coupling 10 in place while manipulating tools, other pipe elements and the like during assembly. In the illustrated embodiment, teeth 48 are angularly oriented toward the opposite side from the side on which they are mounted (see also FIG. 2). Angularly oriented teeth 48 are self-actuating and greatly inhibit withdrawal of a pipe element once inserted into the central space 14.

Figure 2:
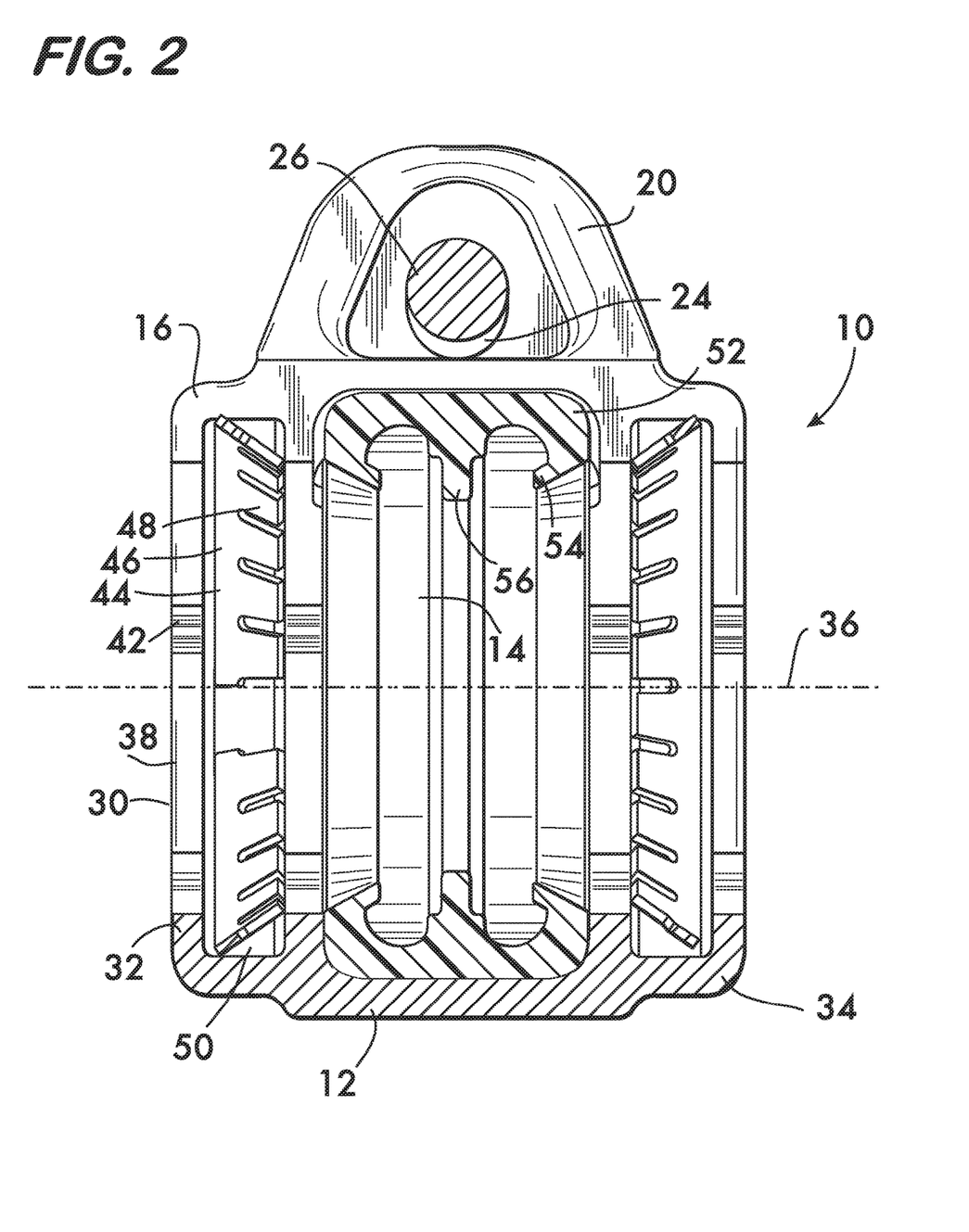
FIG. 2 is a sectional view of the coupling embodiment taken at line 2-2 in FIG. 1.

As shown in FIG. 2, it is advantageous to position the split rings 46 within grooves 50. Grooves 50 are positioned on opposite sides 32 and 34 of the band 12. The grooves 50 face axis 36 and extend lengthwise along each rib 30, in effect, splitting the ribs lengthwise. Forming the grooves 50 within the ribs 30 provides several advantages. The divided ribs support the split rings 46 and prevent them from displacing axially when subjected to load. The grooves 50 also increase the width of the footprint of the ribs on the pipe elements while saving coupling weight. The increased footprint further increases the rigidity of the joint formed with the coupling 10 as described below.

To ensure a fluid tight joint, a seal 52 is positioned within the central space 14 between the ribs 30. In this example embodiment seal 52 is a ring gasket formed of a flexible material such as a rubber compound. Seal 52 has lips 54 which sealingly engage the outer surfaces of the pipe elements when they are inserted into coupling 10 (see FIG. 5). The seal also comprises a central stop 56 which projects inwardly toward axis 36. Stop 56 engages the ends of pipe elements inserted into the coupling 10 to ensure that the pipe elements engage the coupling to the proper depth (see FIGS. 3 and 4). Seal 52 is compressed between the band 12 and the pipe elements upon tightening of the bolt 26 to effect a fluid tight joint (see FIG. 5).

Figure 3:
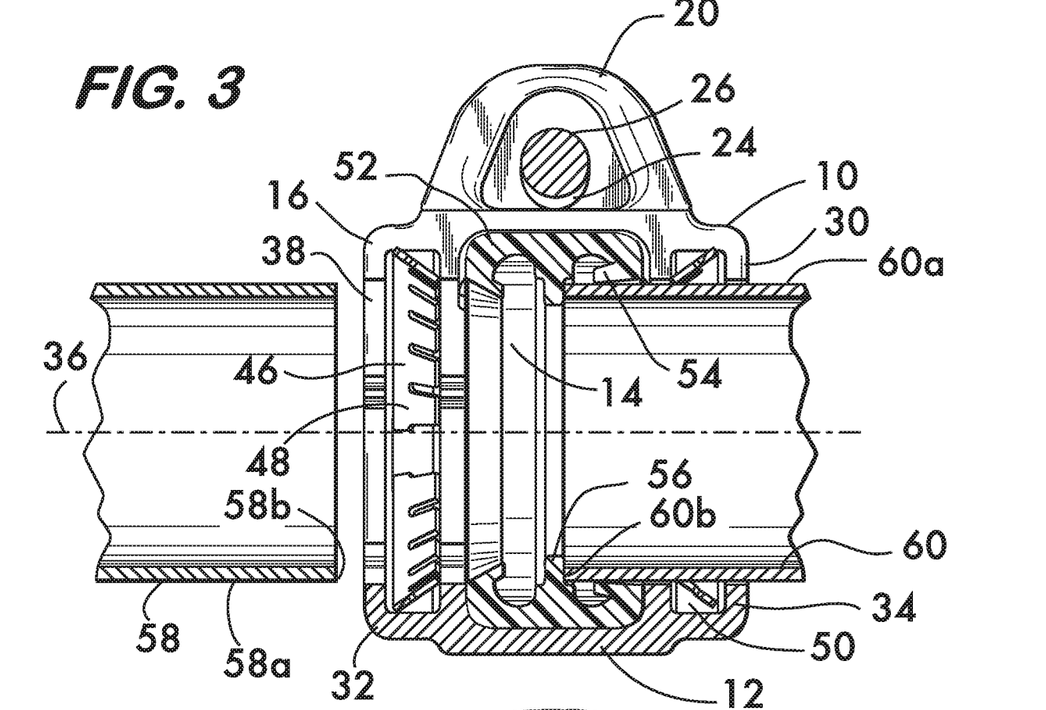
FIGS. 3, 4 and 5 are longitudinal sectional views of a combination of the coupling of FIG. 1 with plain end pipe elements.
Figure 4:
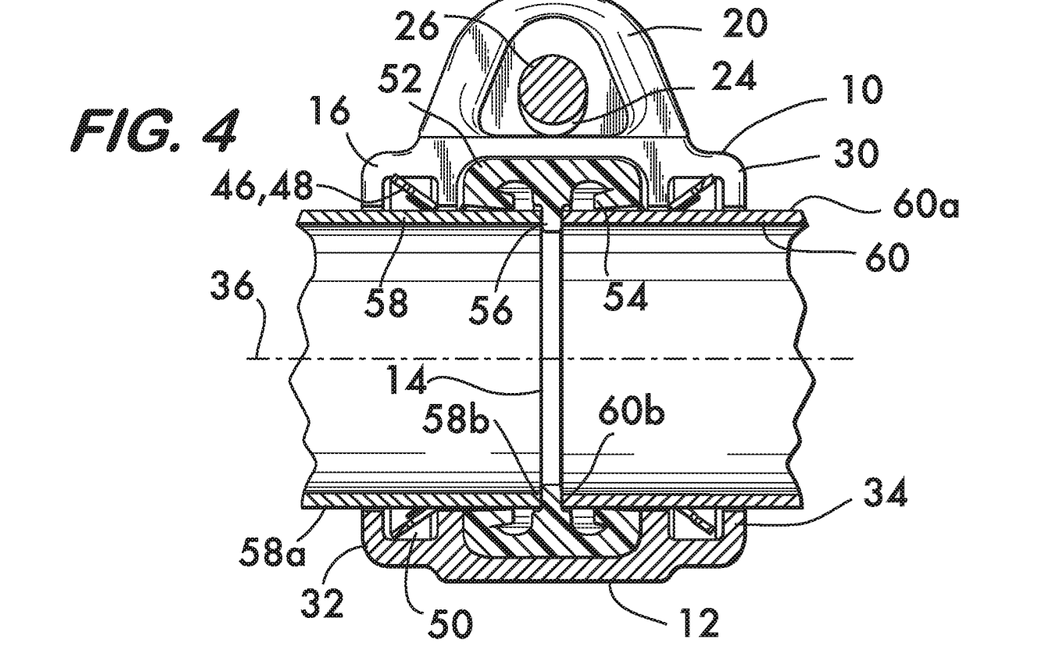
Figure 6:
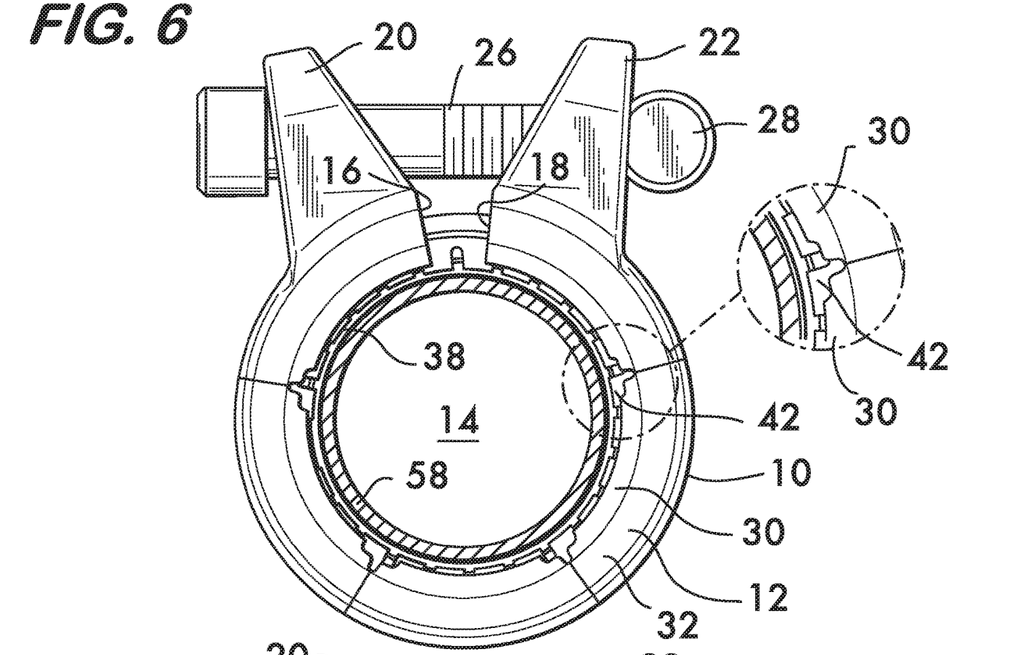
FIGS. 6 and 7 show end views of the pipe coupling of FIG. 1 in use.

As shown in FIGS. 3 and 4, pipe elements 58 and 60 are joined using coupling 10 by first inserting each pipe element axially from opposite sides 32 and 34 into the central space 14 defined by the band 12. Band 12 is in its undeformed state during insertion; i.e., bolt 26 is not yet tightened and ends 16 and 18 are spaced apart from one another (see also FIG. 6). Upon insertion of the pipe elements 58 and 60, the respective outer surfaces 58a and 60a of the pipe elements may be engaged by teeth 48 of the split rings 46. Teeth 48 may be designed to exert sufficient grip to hold the coupling 10 on a pipe element against its own weight, as well as against minor forces exerted during handling of the various components of the joint. The outer surfaces 58a and 60a of the pipe elements 58 and 60 also engage the lips 54 of the seal 52, and the respective ends 58b and 60b of each pipe element 58 and 60 engage the stop 56 to ensure adequate engagement depth between pipe elements and coupling 10. An axial view of the coupling 10 in the undeformed state receiving the pipe element 58 is provided in FIG. 6. Note the gaps 42 between ribs 30 and the spaced apart relation between ends 16 and 18 of band 12 in this view.

Figure 5:
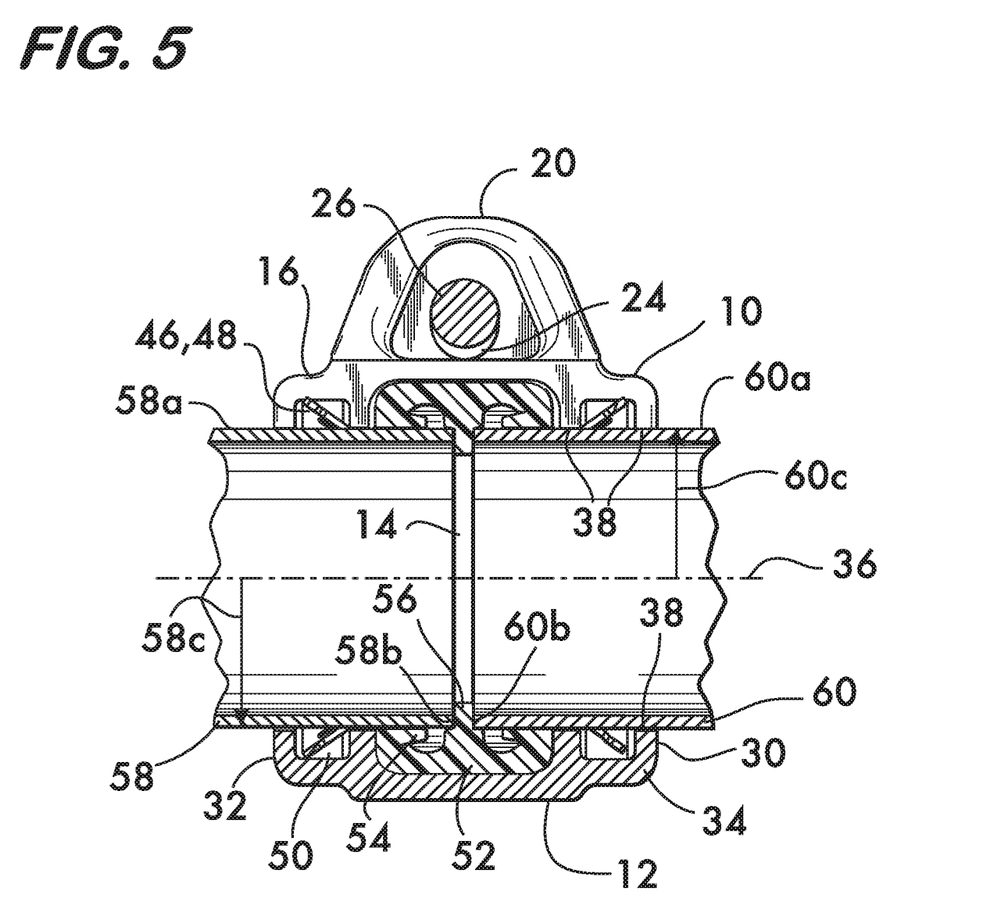
Figure 7:
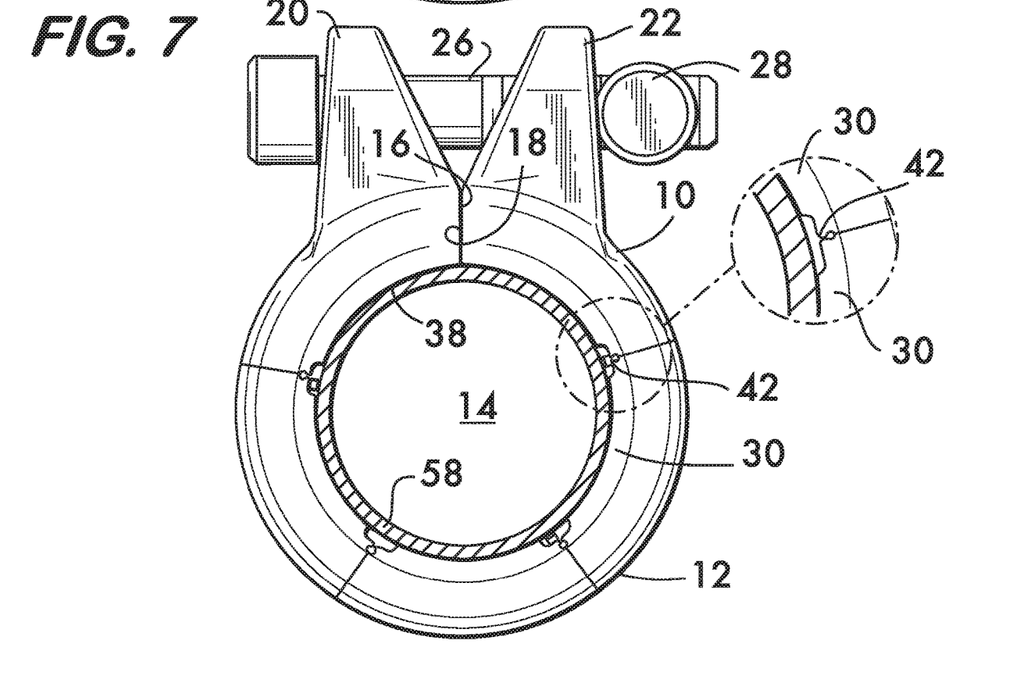

As shown in FIGS. 5 and 7, bolt 26 is then tightened, cooperating with barrel nut 28 to draw the lugs 20 and 22 toward each other and with them the ends 16 and 18 of the band 12. Band 12 deforms primarily at the locations of gaps 42 between the ribs 30 where the bending stiffness of the band is minimum. The band 12 will deform progressively, bending first at gap locations 42 circumferentially distant from the ends 16 and 18 where the applied moment is greatest, and finally at the gap locations closer to the ends. As the band 12 deforms, the rib surfaces 38 are brought into engagement with the outer surfaces 58a and 60a of the pipe elements 58 and 60. This engagement between the ribs 30 and the pipe elements 58 and 60 provides significant bending rigidity to the joint, otherwise absent from similar couplings. The fact that the ribs 30 themselves do not deform significantly is of no consequence because the radii of curvature 40 of the rib surfaces 38 in their undeformed state are equal to the radii of curvature 58c, 60c of the outer surfaces 58a, 60a of the pipe elements 58, 60 which they engage. The wide footprint provided by splitting the ribs 30 with groove 50 further increases the joint bending stiffness by providing spaced apart surfaces 38 which support the pipe elements over a greater distance. It is advantageous to have portions of the connection members (lugs 20 and 22) and/or the ends 16 and 18 contact one another in what is known as "pad to pad" relation when the rib surfaces 38 are brought into engagement with the outer surfaces of the pipe elements. In this example, pad to pad contact is effected when ends 16 and 18 meet, as shown in FIG. 7. Pad to pad contact is advantageous because it provides positive visual confirmation that the coupling is properly installed and avoids the need to specify bolt torques for proper installation. Note also the reduction in the size of gaps 42 in FIG. 7 as compared with FIG. 6.

As band 12 deforms it compresses the split rings 46, which, being split rings, deform radially into a smaller diameter. As the split rings 46 deform, teeth 48 dig further into the surface of the pipe elements and provide increased resistance to axial forces tending to separate the pipe elements from the coupling. Band 12 also compresses the seal 52 against the pipe elements 58 and 60 to ensure a fluid tight joint. Note in FIG. 5 the engagement of lips 54 with pipe element outer surfaces 58a and 60a when seal 52 is compressed.

Figure 8:
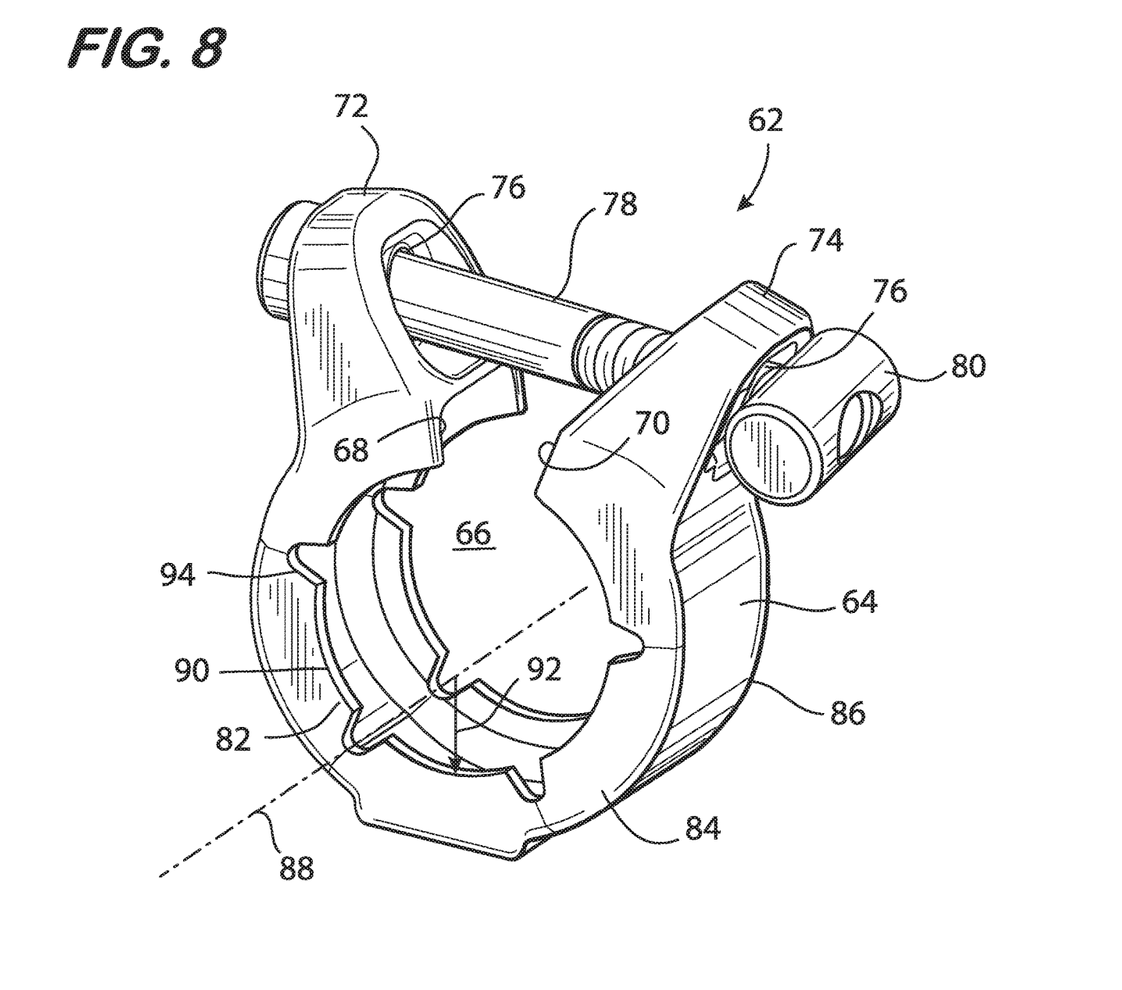
FIG. 8 is an isometric view of another example embodiment of a coupling according to the invention.

FIG. 8 shows a coupling 62 for use with pipe elements having circumferential grooves. Coupling 62 comprises a unitary band 64 which extends circumferentially to surround and define a central space 66. Band 64 is sized so that central space 66 may receive axially inserted pipe elements (see FIGS. 9-11) to be joined end to end. The pipe elements are inserted axially into the central space 66 from opposite sides of the coupling 62. Band 64 has first and second opposite ends 68 and 70 which are positioned in facing relation. Connection members, in this example, outwardly projecting lugs 72 and 74, are positioned respectively on the first and second ends 68 and 70 of the band 64. Each lug 72, 74 has an aperture 76 adapted to receive an adjustably tightenable fastener, for example, the bolt 78 and barrel nut 80. Tightening of the bolt and barrel nut draws the first and second ends 68 and 70 toward one another to clamp the coupling 62 to the pipes being joined as described in detail below.

A plurality of arcuate ribs 82 are positioned end to end along opposite sides 84 and 86 of the band 64. Each rib 82 projects toward an axis 88 arranged coaxially with the central space 66. Each rib 82 has a surface 90 facing the axis 88. In the example embodiment disclosed herein, surfaces 90 are shown as flat surfaces, however, it is understood that the term "surface" as used with reference to ribs 82 encompasses other shapes such as concave, convex as well as knife-edged shapes. When each rib 82 is in an undeformed state, each surface 90 has a radius of curvature 92 equal to the radius of curvature of the outer surface of the pipe element within the circumferential groove which it engages when forming the joint. In the coupling 62, the ribs 82 do not deform significantly. Deformation in coupling 62 is confined primarily to regions of the band 64 between the ribs 82 through the presence of gaps 94 positioned between each rib 82. Gaps 94 isolate the ribs from one another, thereby allowing the ribs 82 to act independently of one another and the band 64 when the band deforms radially upon tightening of the bolt drawing the ends 68 and 70 toward each other. Similar to the coupling 10 shown in FIG. 1, coupling 62 will also have a seal (not shown for clarity, see FIGS. 9-11) within the central space 66 and between the ribs 82.

Figure 9:
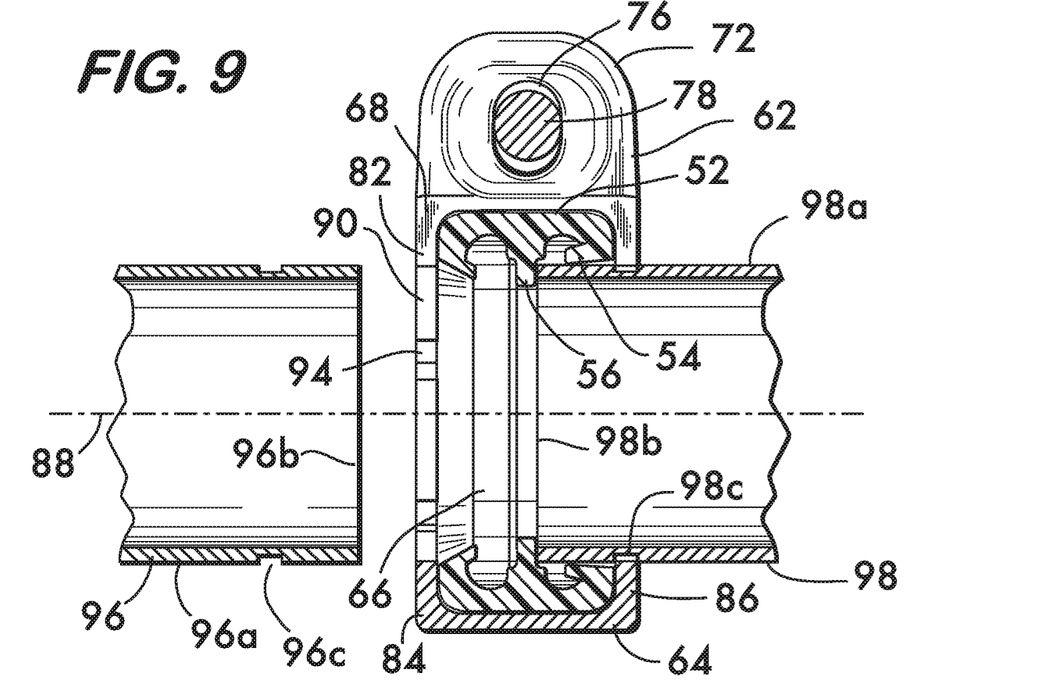
FIGS. 9, 10 and 11 are longitudinal sectional views of a combination of the coupling of FIG. 8 with grooved pipe elements.
Figure 10:
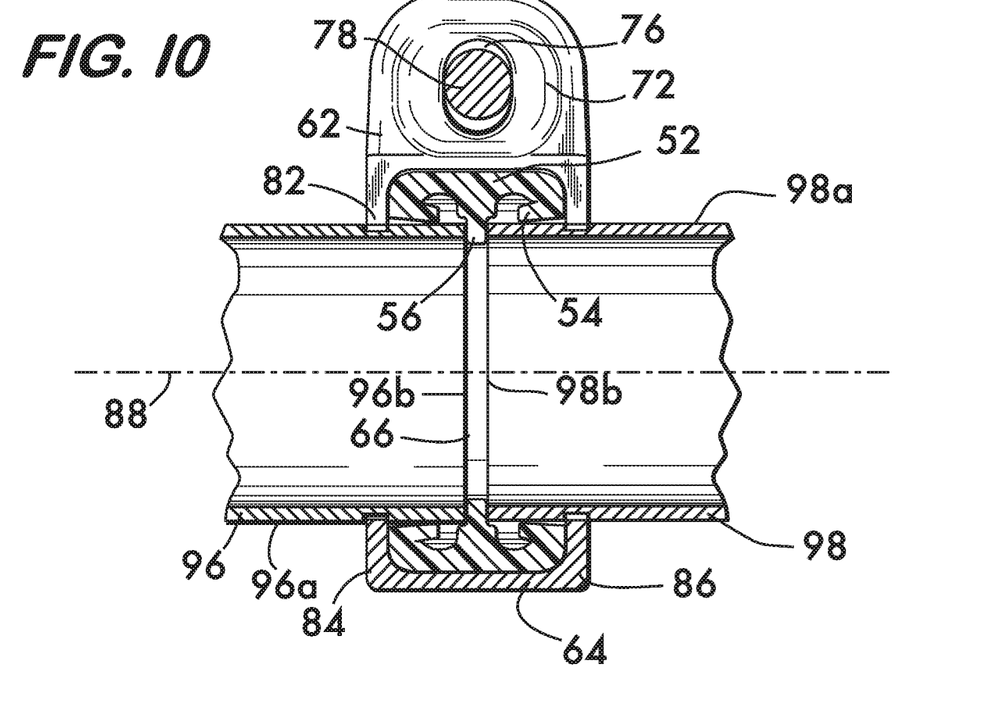

As shown in FIGS. 9 and 10, circumferentially grooved pipe elements 96 and 98 are joined by first inserting each pipe element axially from opposite sides 84 and 86 of the band 64 into the central space 66 defined by the band 64. Band 64 is in its undeformed state during insertion; i.e., the bolt 78 for adjusting the coupling is not yet tightened (see also FIG. 12). Upon insertion, the respective outer surfaces 96a and 98a of the pipe elements 96 and 98 will engage lips 54 of the seal 52 within the central space 66, and the respective ends 96b, 98b of each pipe element 96 and 98 will also engage a stop 56 on the seal 52 to ensure adequate engagement depth between pipe elements 96 and 98 and coupling 62. An axial view of the coupling 62 in the undeformed state receiving the pipe element 96 is provided in FIG. 12. Note the gaps 94 between ribs 82 and the spaced apart relation between ends 68 and 70 of band 64 in this view.

Figure 11:
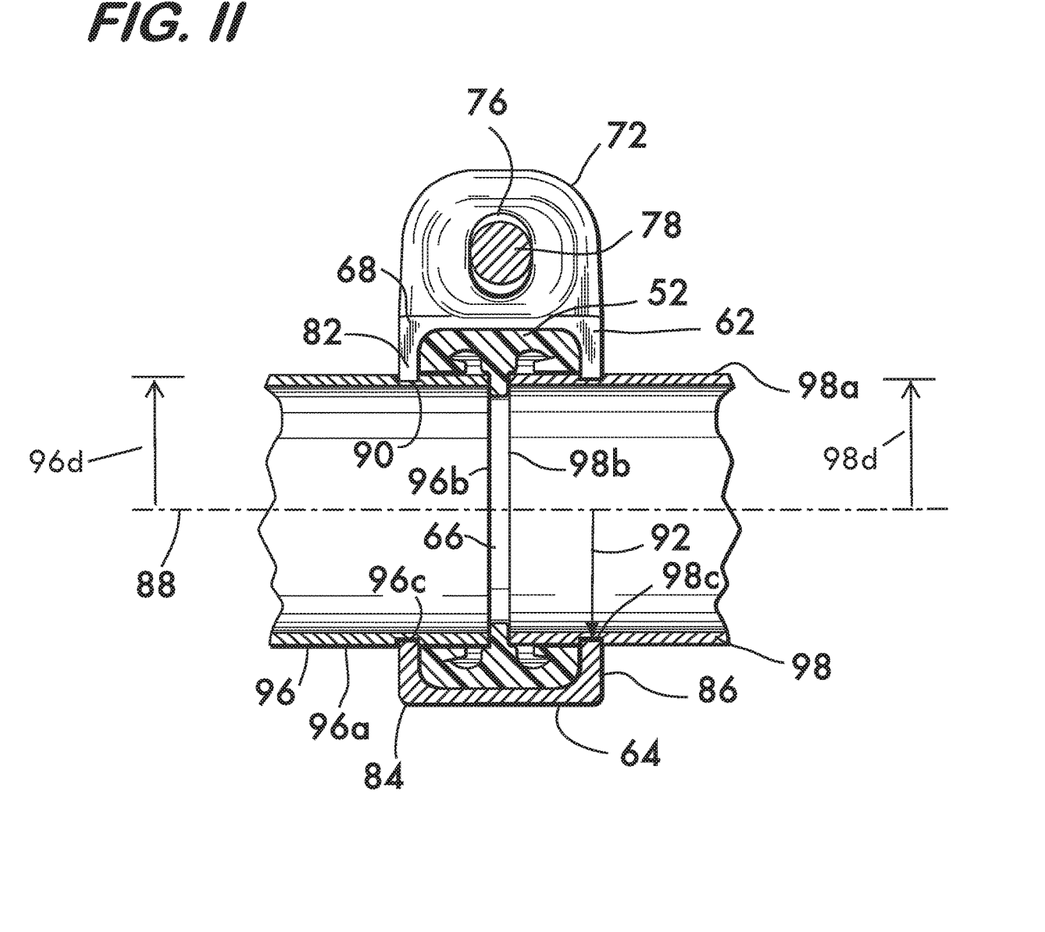
Figure 12:
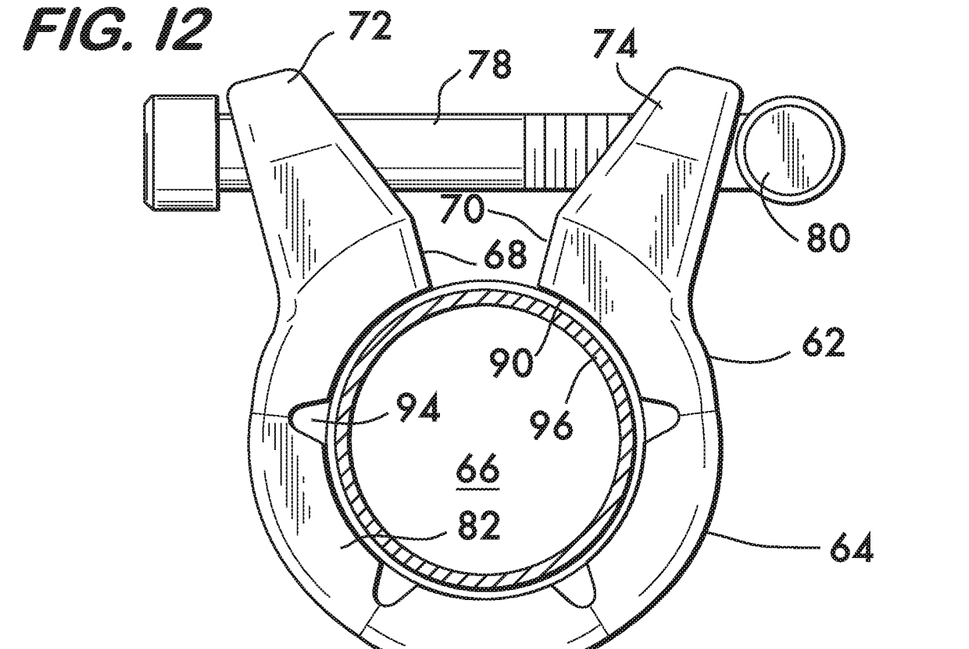
FIGS. 12 and 13 show end views of the pipe coupling of FIG. 8 in use.
Figure 13:
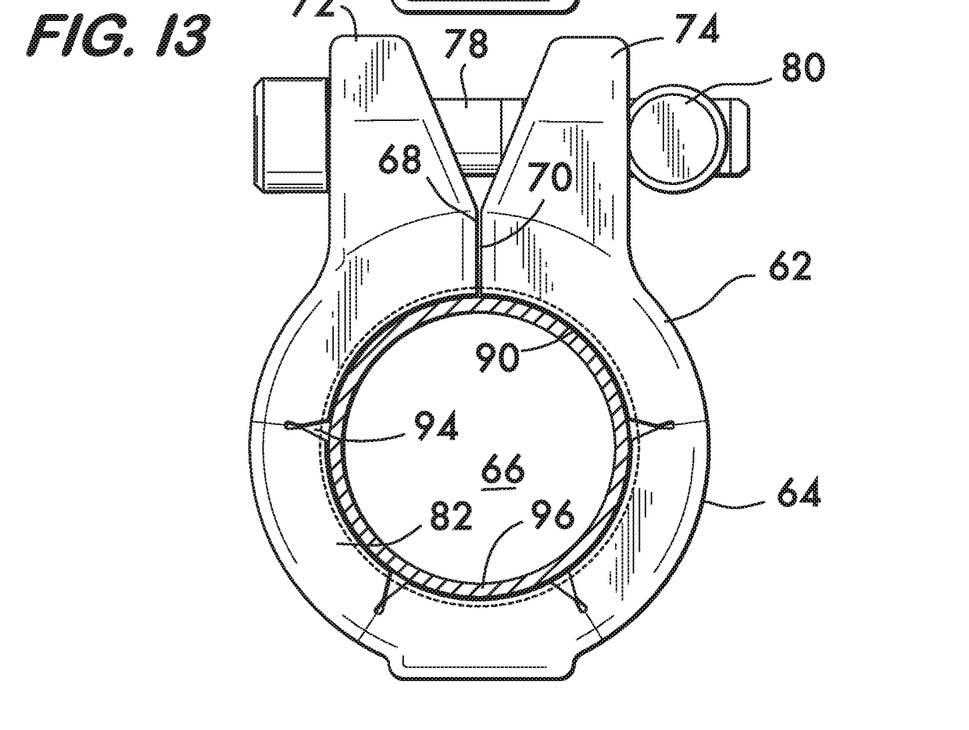

As shown in FIGS. 11 and 13, when the bolt 78 is tightened, it cooperates with barrel nut 80 to draw the lugs 72 and 74 toward each other and with them the ends 68 and 70 of the band 64. Band 64 deforms primarily at the locations of gaps 94 between the ribs 82 where the bending stiffness of the band is minimum. The band 64 will deform progressively, bending first at gap locations 94 circumferentially distant from the ends 68 and 70 where the applied moment is greatest, and finally at the gap locations closer to the ends. As the band 64 deforms, the rib surfaces 90 are brought into engagement with the outer surfaces 96a, 98a of the pipe elements 96 and 98 within respective circumferential grooves 96c and 98c. The fact that ribs 82 themselves do not deform significantly is of no consequence because the radii of curvature 92 of the rib surfaces 90 in their undeformed state are equal to the radii of curvature 96d, 98d of the outer surfaces 96a, 98a of the pipe elements 96 and 96 which they engage. It is advantageous to have portions of the connection members (lugs 72 and 74) and/or the ends 68 and 70 contact one another in what is known as "pad to pad" relation when the rib surfaces 90 are brought into engagement with the outer surfaces 96a, 98a of the pipe elements 96 and 98 within the circumferential grooves 96c, 98c. In this example, pad to pad contact is effected when ends 68 and 70 meet, as shown in FIG. 13. This provides positive visual confirmation that the coupling 62 is properly installed and avoids the need to specify bolt torques for proper installation. As band 64 deforms it compresses the seal 52 against the pipe elements to ensure a fluid tight joint. With the band 64 in the deformed state, as shown in FIG. 13, the size of gaps 94 is smaller as compared with their size when the band is undeformed, as shown in FIG. 12. Note also, in FIG. 11, the engagement of lips 54 with the pipe elements when the seal 52 is compressed.

Figure 14:
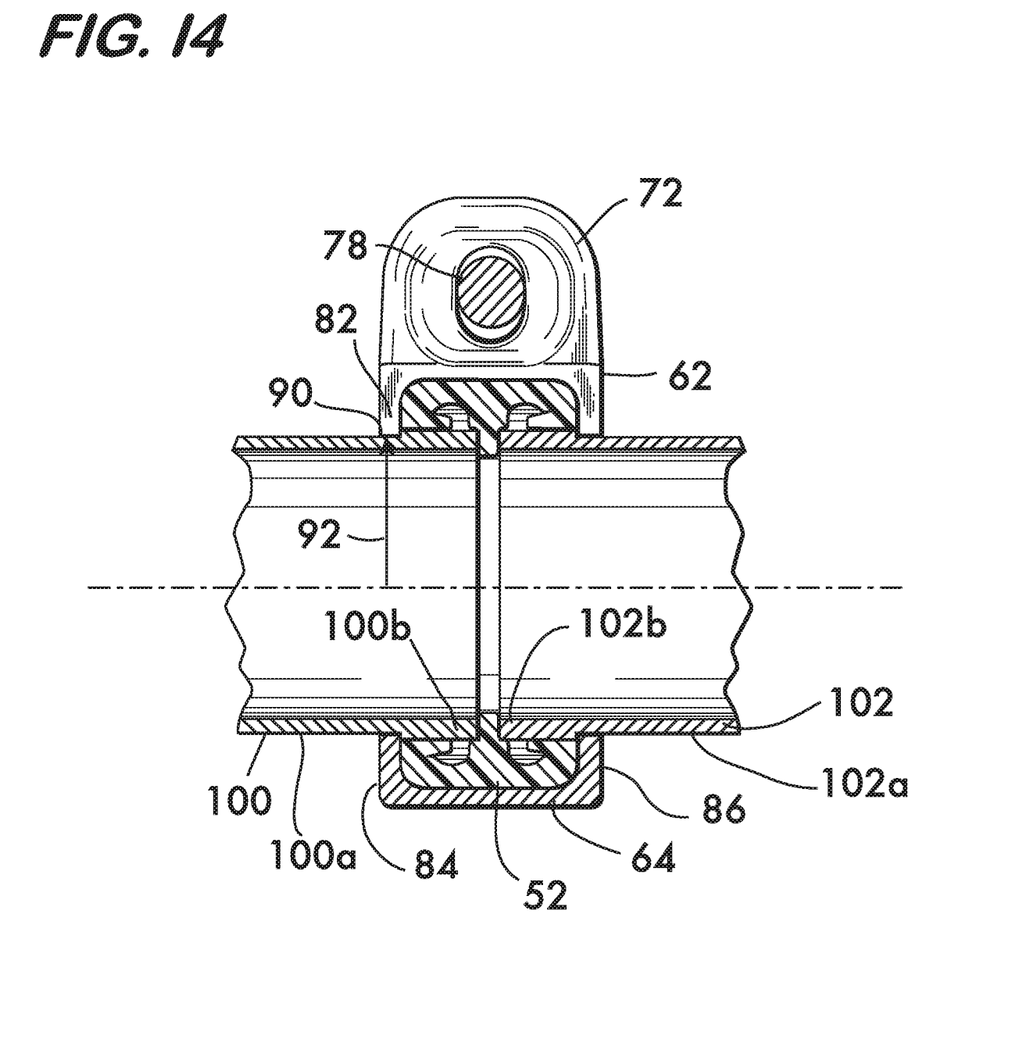
FIG. 14 is a longitudinal sectional view showing an example coupling according to the invention used with shoulder end pipe elements.

The coupling embodiment 62 shown in FIG. 8 may also be used to join shoulder ended pipe elements 100, 102 as well as shown in FIG. 14. In this example, the radii 92 of ribs 82 are equal to the radii of curvature 100a, 102a of the pipe elements 100, 102 adjacent to the shoulders 100b, 102b where the surfaces 90 of the ribs 82 engage the pipe elements.

What is claimed is:

1. A coupling for joining pipe elements in end to end relation, said coupling comprising:
    a unitary band surrounding a central space for receiving said pipe elements, said band having first and second ends positioned in facing relation, wherein said band defines a first plurality of arcuate ribs positioned end to end to form a first side of said band, and a second plurality of arcuate ribs positioned end to end to form a second side of said band opposite to said first side of said band, each of said ribs projecting toward an axis coaxial with said central space, each of said ribs having a surface facing said axis, said surface on each of said ribs having equal radii of curvature when said ribs are in an undeformed state;
    connection members positioned on said first and second ends of said band, said connection members being adjustably tightenable for drawing said first and second ends into contact, said band being deformable between each of said ribs and allowing said first and second ends to contact one another upon adjustable tightening of said connection members, said surfaces on each of said ribs thereby being brought into alignment with a circle having a radius equal to the radii of curvature of said surfaces.

2. The coupling according to claim 1, wherein said surface on at least one of said ribs is a flat surface.

3. The coupling according to claim 1, further comprising a seal positioned within said central space between said first and second plurality of arcuate ribs, said seal surrounding said axis and being engageable with said band and said pipe elements for sealingly joining said pipe elements end-to-end.

4. The coupling according to claim 1, wherein said connection members comprise a pair of projections, one said projection being positioned on each of said first and second ends of said band, said projections extending outwardly and adapted to receive a fastener, said fastener being adjustably tightenable for drawing said first and second ends toward one another.

5. The coupling according to claim 4, wherein said projections comprise lugs each having an aperture therethrough sized to receive said fastener.

6. The coupling according to claim 1, further comprising a first split ring positioned within said central space adjacent to said first plurality of arcuate ribs along said first side of said band, said first split ring having a plurality of teeth projecting toward said axis.

7. The coupling according to claim 6, further comprising a second split ring positioned within said central space adjacent to said second plurality of arcuate ribs along said second side of said band, said second split ring having a plurality of teeth projecting toward said axis.

8. The coupling according to claim 1, further comprising:
    a first plurality of grooves, each said groove extending lengthwise along a respective one of said first plurality of arcuate ribs positioned along said first side of said band, each of said grooves facing said axis;
    a first split ring positioned within said first plurality of grooves, said first split ring having a plurality of teeth projecting toward said axis, said teeth engaging an outer surface of said pipe element.

9. The coupling according to claim 8, further comprising:
    a second plurality of grooves, each said groove of said second plurality of grooves extending lengthwise along a respective one of said second plurality of arcuate ribs positioned along said second side of said band, each said groove of said second plurality of grooves facing said axis;
    a second split ring positioned within said second plurality of grooves, said second split ring having a plurality of teeth projecting toward said axis, said teeth of said second split ring engaging said outer surface of said pipe element.

10. The coupling according to claim 1, wherein said first and second plurality of arcuate ribs are separated from one another by gaps positioned between each of said ribs.

11. The coupling according to claim 1, wherein said surfaces of said first and second plurality of arcuate ribs engage outer surfaces of said pipe elements when said connection members contact one another.

12. The coupling according to claim 1, wherein said connection members are tightened to a tightened condition in which said first and second ends are in contact with one another, wherein when said connection members are in said tightened condition, said band is deformed between each of said ribs, and said surfaces on each of said ribs are in alignment with said circle.

* * * * *